(12) United States Patent
Barbier (10) Patent No.: US 12,552,121 B2
(45) Date of Patent: Feb. 17, 2026

(54) METHOD FOR INTEGRATING A FITTING BETWEEN THE WINGS OF A PROFILE

(71) Applicant: DAHER AEROSPACE, Orly (FR)

(72) Inventor: Quentin Barbier, Nantes (FR)

(73) Assignee: DAHER AEROSPACE, Orly (FR)

( * ) Notice: Subject to any disclaimer, the term of this patent is extended or adjusted under 35 U.S.C. 154(b) by 43 days.

(21) Appl. No.: 18/518,129

(22) Filed: Nov. 22, 2023

(65) Prior Publication Data

US 2024/0165904 A1     May 23, 2024

(30) Foreign Application Priority Data

Nov. 23, 2022 (FR) ...................................... 2212240

(51) Int. Cl.
| | |
|---|---|
| *B29D 99/00* | (2010.01) |
| *B29C 70/38* | (2006.01) |
| *B64C 3/18* | (2006.01) |
| *B29C 70/46* | (2006.01) |

(52) U.S. Cl.
CPC ........ *B29D 99/0025* (2013.01); *B29C 70/382* (2013.01); *B64C 3/185* (2013.01); *B64C 3/187* (2013.01); *B29C 70/462* (2013.01)

(58) Field of Classification Search
None
See application file for complete search history.

(56) References Cited

U.S. PATENT DOCUMENTS

2017/0247115 A1    8/2017    Mandel et al.

FOREIGN PATENT DOCUMENTS

WO        2021018002 A1      2/2021

*Primary Examiner* — Abbas Rashid
*Assistant Examiner* — Adrianna N Konves (57) ABSTRACT

The invention pertains to a method for integrating a fitting fitted between two wings of a composite profile comprising the steps of: obtaining a preform of a fitting impregnated with a thermosetting resin, comprising two flanges and a rib; pre-curing the laminate preform of the fitting to obtain a partial polymerization of the preform; laying up a laminate preform of the profile so that fibers impregnated with a thermosetting resin included in two of the wings of the laminate preform of the profile are laid up over the two flanges of the preform of the partially polymerized fitting; and completely polymerizing an assembly comprising the laminate preform of the profile and the laminate preform of the partially polymerized fitting while maintaining into contact the flanges of the laminate preform of the fitting with the wings of the laminate preform of the profile.

9 Claims, 9 Drawing Sheets

METHOD FOR INTEGRATING A FITTING BETWEEN THE WINGS OF A PROFILE

RELATED APPLICATIONS

This application claims priority of French application #FR2212240 filed on Nov. 23, 2022 the content of which is hereby introduced by reference in its entirety.

TECHNICAL FIELD

The invention belongs to the field of the implementation of composite materials. More specifically, the invention relates to a structural assembly comprising a composite part in the form of a profile incorporating a stiffener comprising an interface fitting, forming for instance a clevis. Such a fitting has a structural role of stiffening and/or is used for connecting to an operating device such as a cylinder. The invention is particularly, but not exclusively, intended for the aeronautical field for making an aircraft wing spar.

BACKGROUND ART

A wing spar, is the main structural element of an aircraft wing, extending according to the wingspan, substantially perpendicular to the fuselage in the case of an aircraft wing. An aircraft wing comprises one or more spars designed to bear all the loads undergone along the span, they also incorporate functions relating to the control of the aerodynamic shape of the wing, in particular for the movement of the mobile elements of the wing. To this end, spars are comprising interface fittings such as clevises, making connections to effectors such as hydraulic or electric cylinders to enable such wing elements movements.

These mechanical means, which can also play a structural stiffening role, are, according to prior art, assembled to the spar by riveting.

The manufacturing of an aircraft wing box structure made of a composite material and limiting the number of riveting operations is for instance described in particular in document EP 3 041 664/U.S. Pat. No. 10,350,830. However, this technical solution of the prior art relates to the manufacturing of a boxed structure integrating stiffeners, spars and ribs, but does not address the integration of technical parts, in particular of the interface fittings.

As of today, adding these technical parts, which most of the time remain metallic even if the spar itself is made of an organic matrix composite material, requires time-consuming riveting operations, said riveting is also increasing the mass of the assembly thus manufactured.

In addition, the contact of a metallic part with a composite part reinforced by electrically conductive fibers such as carbon fibers, leads to a galvanic coupling that may lead to corrosion issues in the metallic part, which requires, for example, the interposition of a ply of glass fibers between the metallic part and the composite part, thus adding still an additional operation.

Finally, rivets may give rise to sealing issues that shall be addressed, particularly in a fuel tank area.

Regardless of their assembly method, the fittings are integrated to the profile between two flanges so that they are linked to 3 sides of the profile. This configuration makes it difficult to integrate these fittings into a composite preform made from pre-impregnated plies.

Indeed, the volume of such a preform, whether it is the preform of the profile or the preform of the fitting, is not the same in an uncured state than in a polymerized state. Typically, the thickness of an uncured ply laminate is greater than the thickness of the same laminate once polymerized. This phenomenon is sometimes referred to by the term bulking, the variation in thickness is in the order of 25% magnitude, which means that for a flange or a web of a profile having roughly a 10 mm thickness, the thickness difference between the uncured state and the polymerized state may reach 2.5 mm and the variation of a distance measured between two flanges parallel to their thickness may reach the double, i.e. 5 mm.

Figure 1:
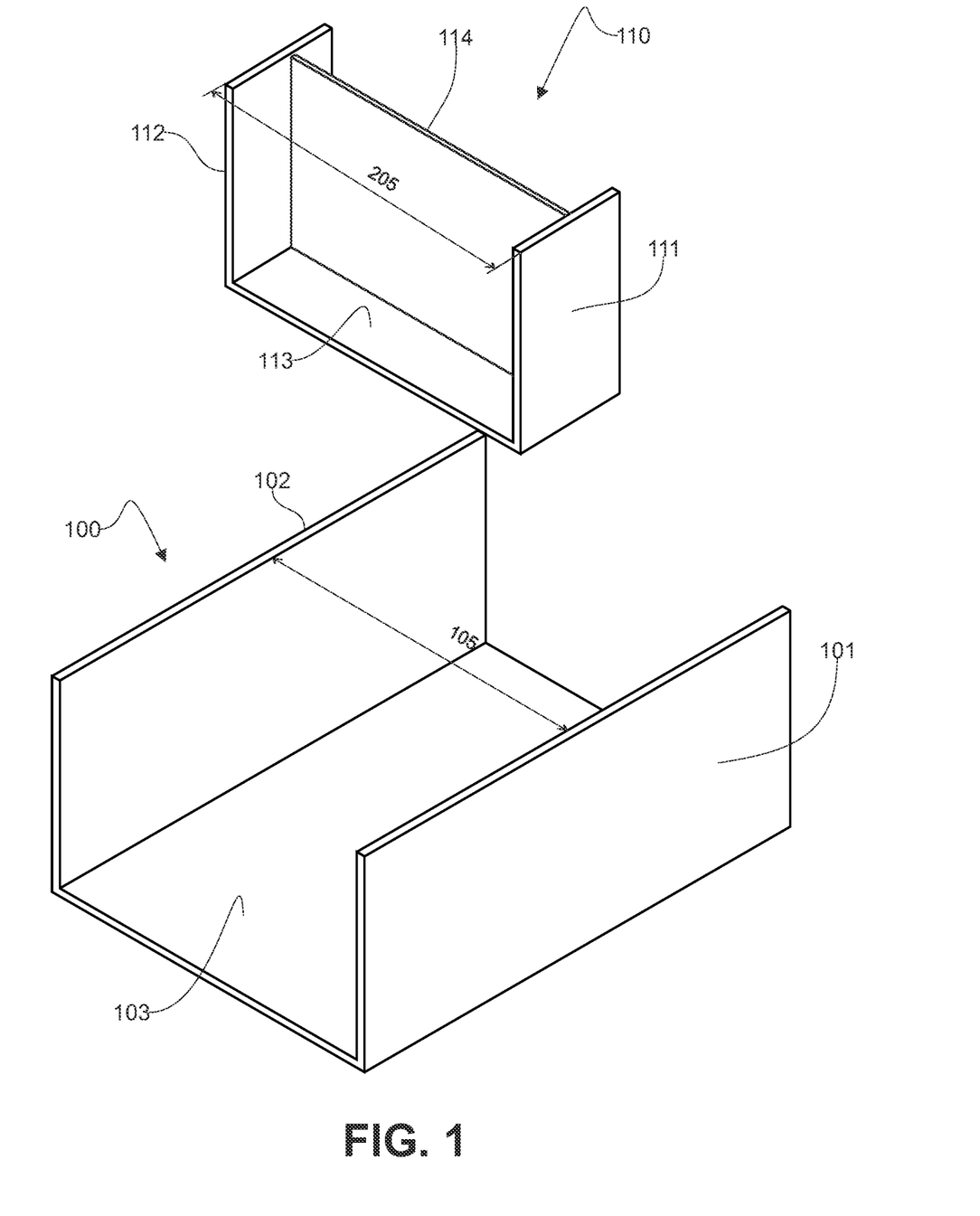
FIG. 1 shows in an exploded perspective view of the elements assembled during the implementation of the method of the invention.

FIG. 1 illustrates the issue. Due to this bulking effect in cross section, the distance (105) between the laminate corresponding to the flanges (101, 102) of the non-polymerized preform of the profile (100) constituting the spar is less than this same distance measured on the cured profile after polymerization.

On the other hand, with regard to the preform of the fitting (110), the distance (115) between the laminate corresponding to the flanges (111, 112) to be assembled with the flanges of the spar profile (101, 102) is greater than this same distance measured on the polymerized fitting.

As a result of this phenomenon, it is very difficult or even impossible to obtain an assembly by co-consolidation or co-curing of the two preforms, even using specific tooling, so that integrally stiffened composite profiles of this type are obtained by techniques such as resin injection in dry preforms.

However, these injection techniques are complex to implement, they require expensive toolings and are difficult to automate.

In addition, when implementing these injection techniques, it is difficult to obtain a uniform and compact filling of resin without defect, especially when the parts are very long and when the reinforcement ratio is high, as it is the case for an aircraft wing spar.

Document US 2017/247115 discloses a method for manufacturing a part made of a composite material including pre-curing to a predetermined shape a fitting made of discontinuous long fibers in a first thermosetting resin contacting the pre-cured fitting with a second preform comprising continuous fibers impregnated with a second thermosetting resin, polymerizing the first and second preforms.

Document WO 2021/018002 discloses a compression molding mold assembly and a compression molding method for an I-shaped reinforcement member of thermoplastic composite material.

SUMMARY OF THE INVENTION

The invention aims to solve the disadvantages of the prior art and relates to this end to a method for integrating a laminar composite fitting adjusted between two wings of a laminar composite profile comprising the steps of:

I) obtaining a laminate preform of a fitting comprising a fibrous reinforcement impregnated with a thermosetting resin, the laminate preform of the fitting comprising two flanges intended to be inserted in contact between 2 wings of a profile and a rib extending between the two flanges and integral therewith;

II) pre-curing the laminate preform of the fitting to obtain a partial polymerization of the preform of the fitting;

III) laying up a laminate preform of the profile so that fibers impregnated with a thermosetting resin included in two of the wings of the laminate preform of the profile are laid up on the two flanges of the preform of the partially polymerized fitting; and IV) completely polymerizing an assembly comprising the laminate preform of the profile and the laminate preform of the partially polymerized fitting while maintaining into contact the flanges of the laminate preform of the fitting with the wings of the laminate preform of the profile.

Thus, after partial polymerization, the preform of the fitting is dimensionally stable, and its dimensions do not vary or only slightly during the co-polymerization with the preform of the profile. Since the polymerization of the preform of the fitting is only partial, said fitting will be integrated into the profile during the final curing resulting in the complete polymerization of the assembly, that is to say the molecular chains of the [polymer making the matrix develop and cross the interfaces between the flanges of the fitting and the wings of the profile during the final polymerization.

The invention may be carried out according to the embodiments and variants exposed hereafter, which are to be considered individually or according to any technically operative combination.

Advantageously, a partial polymerization ratio obtained at the end of step ii) is comprised between 70% and 80%. Being partially polymerized, the preform of the fitting exhibits sufficient rigidity to be manipulated and positioned accurately in a tooling. The preform is non-tacky, dimensionally stable and can be stored at room temperature for several months.

However, the polymerization ratio reached allows the polymer to remain "active" and to co-consolidate with another part.

According to an embodiment, the laminate preform of the fitting comprises two half-preforms obtained by the layup of fibers pre-impregnated with the thermosetting resin, said half-preforms being assembled by precuring during step ii) along a contact plane located in the web. This embodiment makes it possible to use the same tooling for all the manufacturing operations.

Advantageously, the layup of a half-preform is performed on 4 faces of a template, the mean planes of at least 3 of said faces being secant. This embodiment makes it possible to create a one-piece fitting whose one-piece flange is integral with the web and the wings of the profile.

According to an embodiment, the layup of the half-preforms is performed by hand.

According to another embodiment, the layup of the half-preforms is carried out by automated placement of preimpregnated fibers.

Thus, the method of the invention offers a lot of flexibility in terms of implementation.

According to a particular embodiment, the rib of the fitting comprises two branches forming a clevis and the method comprises before step ii) steps of:
  obtaining a laminate composite preform of the clevis, and
  inserting the laminate composite preform of the clevis between the two half-preforms so that they are partially copolymerized together during step ii).

Thus, the method makes it possible to make an integral fitting comprising a clevis.

Advantageously, the preform of the clevis is laid up on a core.

According to this embodiment, a portion of a branch of the clevis is canted by an angle $\alpha$ less than 45°.

The invention also relates to a tooling configured for implementing step ii) of the method, the tooling comprising:
  a base comprising translational guiding means,
  two templates guided on the translational guiding means, one of the two templates being stopped in translation relative to the base,
  a tight tarpaulin configured to creating a tight seal enclosure comprising the two templates, and
  means for vacuum evacuating the tight seal enclosure.

Thus, the same tooling is used for the layup of the fittings and for their partial polymerization.

According to an embodiment of the tooling, the fitting comprises a clevis and the core is guided in translation on the translational guiding means of the base.

According to an advantageous embodiment, the tooling comprises a plurality of pairs of templates guided in translation relative to the base.

This tooling is advantageously used for the implementation of a method in which:
  the tooling is used for the partial polymerization of the fittings in step ii),
  the tooling is used as a mandrel, the partially polymerized fittings being held in the tooling, for the layup of step iii),
  the tooling comprising the preform of the profile, laid up on said tooling in step iii), is used for the complete polymerization of the assembly in step iv).

The method and the tooling of the invention are advantageously used for the manufacturing of an aircraft wing spar comprising two wings and a web and a plurality of fittings, the spar and the plurality of fittings being made of a continuous fibrous-reinforced thermosetting organic matrix composite in which the plurality of fittings are made integral with the wings and the web.

BRIEF DESCRIPTION OF THE DRAWINGS

The invention is implemented according to the preferred embodiments, in no way limiting, exposed hereafter with reference to FIGS. 1 to 11 in which.

DETAILED DESCRIPTION

FIG. 1 the invention relates to a method for integrating a fitting (110) between two wings (101, 102) of a U-shaped or I-shaped profile.

The fitting comprises at least two flanges (111, 112) and according to an exemplary embodiment may comprise three flanges (111, 112, 113) intended to be made integral with the 2 wings (101, 102) and according to a specific embodiment to be made integral with the two wings and a web (103) of the profile (100).

Integration means that at the end of the implementation of the method the flanges of the fitting, the wings and the web of the profile are made of the same material as if they had been molded together.

The fitting includes a rib (114) extending between the flanges and integral therewith over at least a portion of its perimeter.

Figure 2:
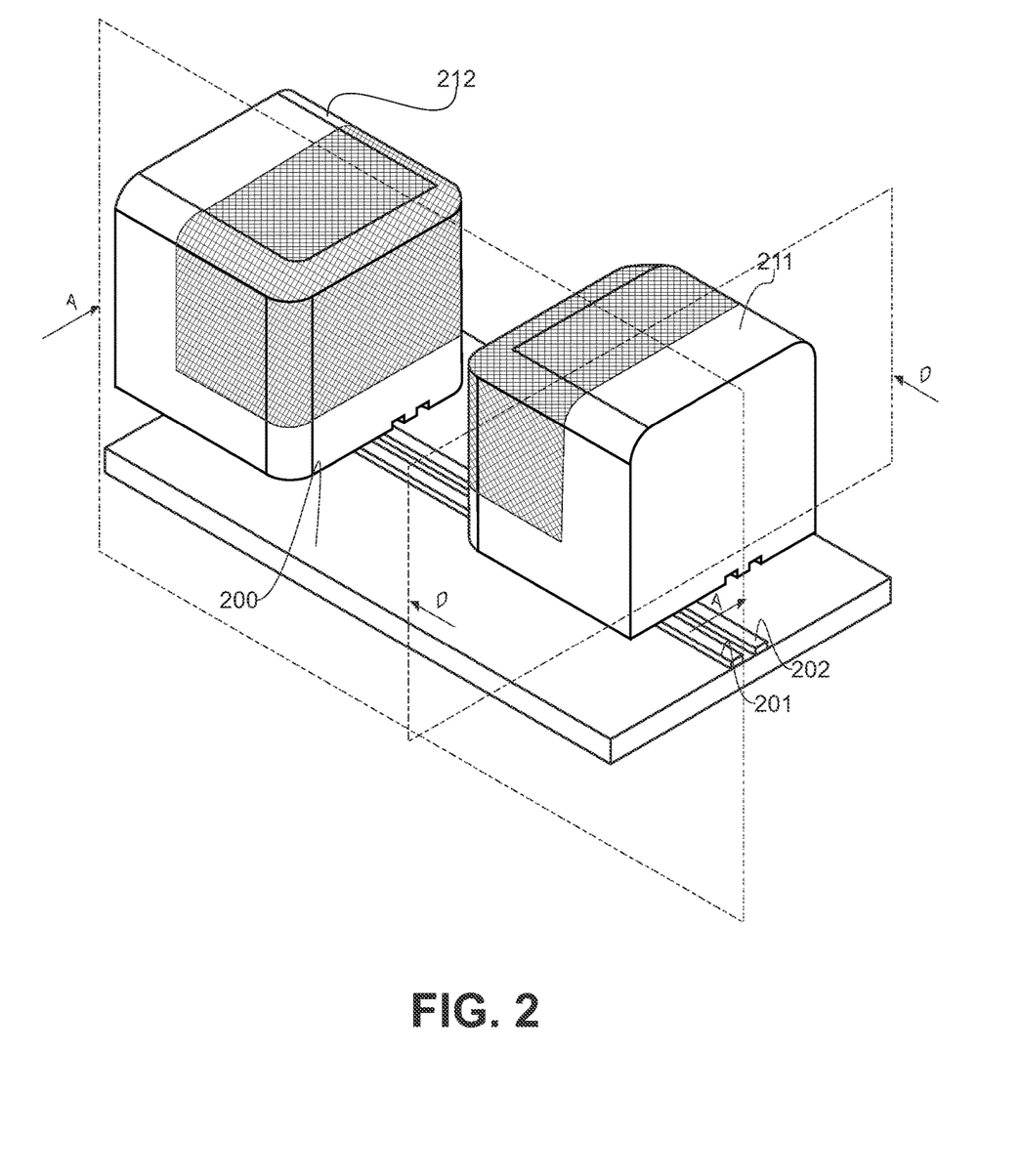
FIG. 2 shows in a perspective view an exemplary embodiment of a tooling for the lay up and consolidation of a fitting.

FIG. 2 according to an exemplary embodiment, the fitting is manufactured by means of a tooling comprising a base (200) comprising means for positioning (201, 202) and guiding in translation two templates (211, 212) on which two half-preforms of the fitting are laid up.

At least the base and the guiding means are made of a material having a coefficient of thermal expansion close to that of the composite constituting the fitting. By way of non-limiting example, at least the base and the guiding means are made of a nickel-iron alloy of the INVAR® type.

According to exemplary embodiments, the templates are also made of INVAR® or of a tool steel. In the event that the templates are not made of INVAR®, their thermal expansion during a curing step contributes to subjecting the preforms to a compaction pressure and an assembly pressure.

Figure 3:
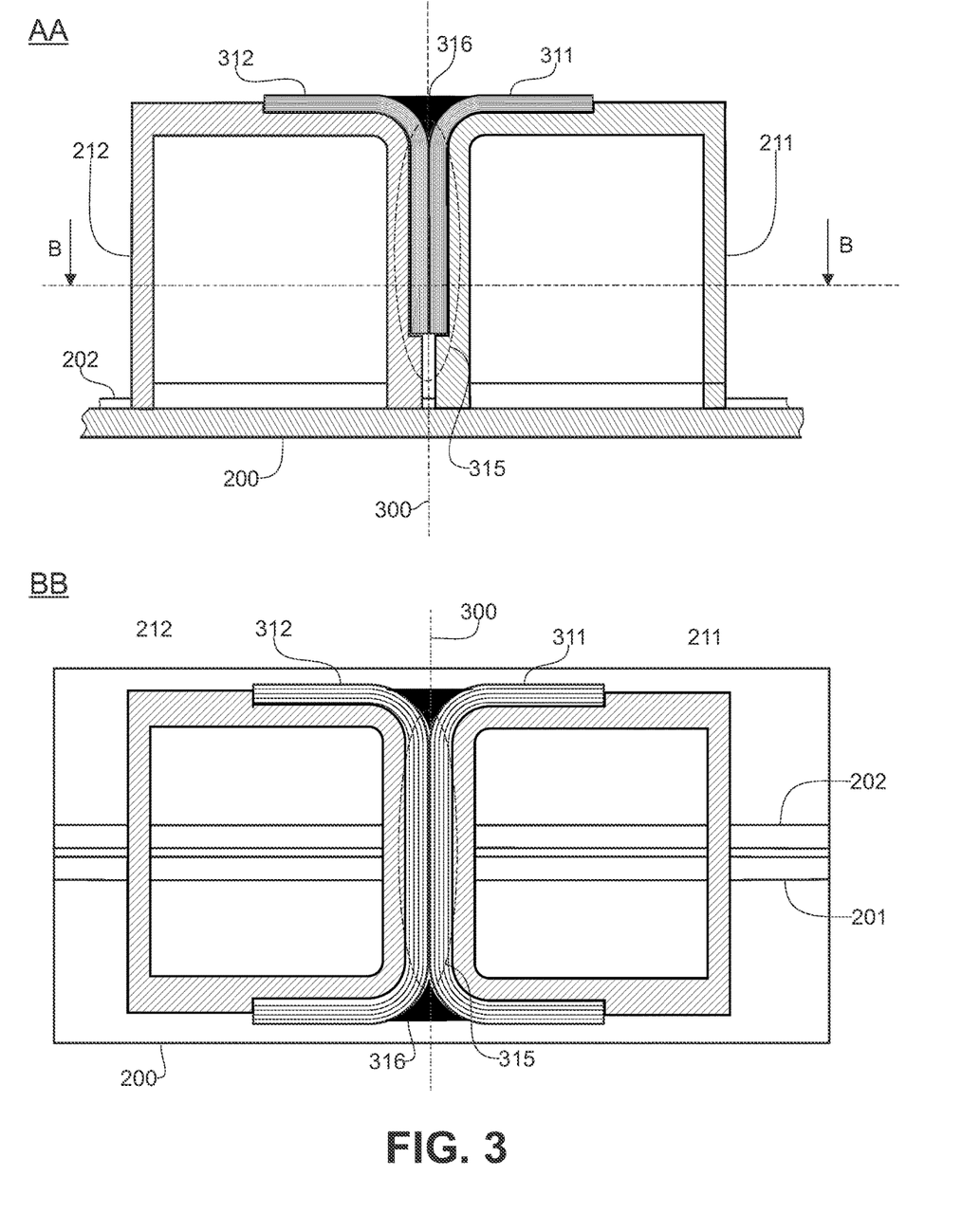
FIG. 3 shows the tooling of FIG. 2 with a preform of the fitting along a section AA defined in FIG. 2 and along a section BB in a plane perpendicular to the section plane AA.

FIG. 3 the layup of the two half-preforms (311, 312) are performed separately on four faces of their respective templates (211, 212) said four faces being shown with cross hatches FIG. 2. Then, the assembly is assembled on the base (200) of the tooling, the portion constituting the fitting (315) being located between said templates after assembly, so that the two half-preforms are in contact with each other along a contact plane (300) located substantially halfway between the portion constituting the rib.

For manufacturing a fitting, the flanges that are in contact with each of the wings as well as with the web of the profile and comprising a rib extending between the flanges and perpendicular to said flanges, each template comprises at least 4 faces, the shapes of which and their orientation correspond to those of the flanges and of the rib.

Thus, according to the example shown in FIG. 2 each template comprises 4 faces oriented along 3 planes perpendicular to each other. In general, each template comprises 4 faces oriented along at least 3 secant mid-planes.

According to a particular embodiment, the template may comprise one or more non-flat faces. In the case where a face is flat, the mean plane is tangent to the face. In the case where a face is non-planar, the mean plane is defined by a position relative to the face such that the volume between the mean plane and the part of the face lying on one side of that plane (e.g. above) is equal to the volume between the mean plane and the part of the face lying on the other side of that mean plane (e.g. below).

Figure 6:
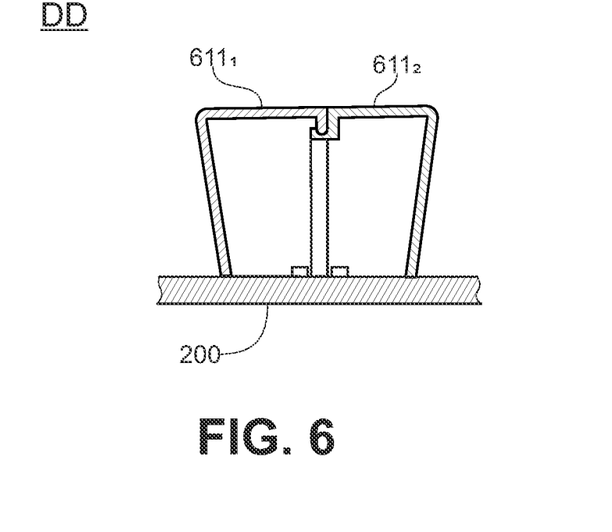
FIG. 6 shows according to a section DD defined in FIG. 2 an exemplary embodiment of a template in two parts.

When the faces of the template are not flat, the latter may be made in several parts as shown FIG. 6 so as to allow the fittings to be removed from the mold after manufacturing.

Advantageously, a filling element (316), commonly referred to as a "nail head", is placed at the junction between the half-preforms corresponding to the junction between the future flanges of the fitting.

Figure 4:
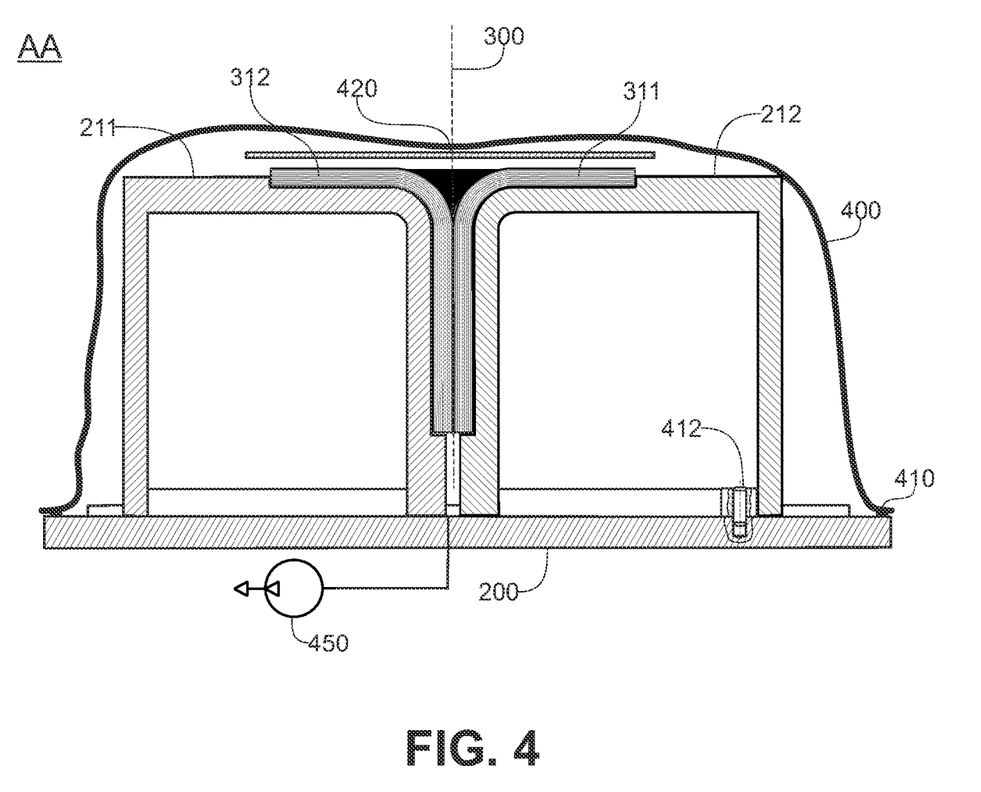
FIG. 4 shows, according to section AA, an exemplary embodiment of the pre-curing tooling for a fitting.

FIG. 4 the same tooling may be used for precuring the fitting. To this end, the assembly comprising the tooling and the two half-preforms is bagged in a tight tarp 400) comprising sealing means (410) so as to delimit a sealed enclosure around the two half-preforms.

Compaction plates (420), also known as "caul plates" may be placed between the flanges of the half-preforms and the tarp (400) in the different planes in which said flanges extend.

The enclosure delimited by the tarp (400) is evacuated by appropriate means (450), the assembly is then placed in an oven or in an autoclave so as to apply a precuring cycle designed to reach a targeted partial polymerization ratio, typically comprised between 70% and 80%.

The partial polymerization may be obtained by bringing the two half-preforms mounted in the tooling to a temperature comprised between 50° C. and 180° C. during a holding time compatible with a foreseen partial polymerization ratio.

For a given thermosetting resin, the precuring temperature and the holding time for obtaining a given partial polymerization may be determined by tests on samples, for example using the experimental design method, by a method such as differential scanning calorimetry for determining the polymerization ratio reached and corresponding to the different combinations (temperature, time, pressure) of tested conditions.

The polymerization ratio may, for example, be measured by differential scanning calorimetry (DSC) according to ISO 11357-5 standard. The polymerization ratio is calculated from the reaction enthalpy of the partially polymerized tested material and the reaction enthalpy of the same non-polymerized material serving as a reference.

As a non-limiting example, the precuring of a preform of a fitting made of a prepreg impregnated with an epoxy resin commercially available under the brand name Hexcel® and the designation OOA M56, is carried out at 135° C. for 350 min under a pressure of 950 mbar, which corresponds to a primary vacuum in the enclosure delimited by the tarp, i.e. by an outside of autoclave method, to obtain a polymerization ratio comprised between 70% and 80%.

Such a prepreg is for instance supplied by Hexcel Composites Sales: Parc Les Algorithmes, Euclide Building, Avenue Didier Daurat, Blagnac 31 700 France. The method is more particularly but not exclusively adapted to the implementation of resins optimized for out of autoclave curing. Thus, other OOA-type epoxy resins (optimized for out of autoclave type curing) from this supplier are also adapted to the implementation of the method, as well as reference 8552.

To ensure a suitable material integrity, a pressure comprised between 850 mbar and 1,000 mbar is necessary and sufficient.

In the case of massive parts, the exothermic nature of the polymerization may result, at least locally, in higher polymerization ratios, of the order of 90%, for an initially foreseen maximum ratio of 80%. The key is to keep the resin "active" at the interfaces, so that co-polymerization can occur, which is why trials may still be necessary based on the principles set out above for fine tuning the method conditions in the framework of a specific implementation.

At least one of the templates (212) is blocked in translation in a direction imposed by the guiding means (201, 202 in FIG. 2), for example by a locating pin (412) in the base (200). The other template (211) can be kept free in translation in the same direction or may also be stopped by a locating pin in the base.

Thus, the evacuation of the enclosure delimited by the tarp (400) or the pressure applied in the case of the use of an autoclave, subjects the part of the preform constituting the rib to a compacting pressure, the template configured to be free in translation (211) being moved towards the template (212) stopped in translation by the locating pin (412), thus compacting the rib.

The pressure exerted by the tarp (400) cooperates to the compaction of the flanges via the compaction plates (420).

The templates (211, 212) may advantageously include shoulders on their different faces to calibrate the thicknesses of the flanges and of the rib during the precuring step.

Figure 5:
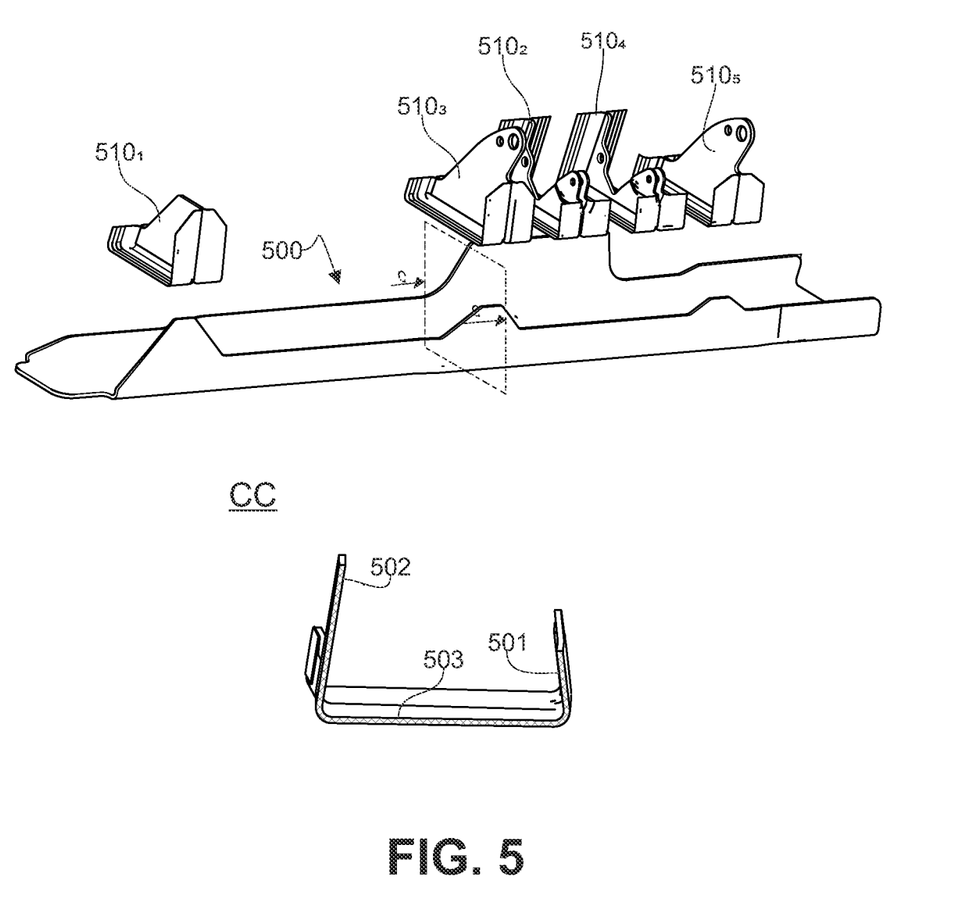
FIG. 5 illustrates according to an exploded perspective view and a sectional view CC defined in this same figure, an exemplary embodiment of a portion of an aircraft wing spar.

FIG. 5 according to an exemplary embodiment, a wing spar portion may comprise a profile (500) whose section, substantially U-shaped, may comprise a pinching of the wings (501, 502) tending to close up according to their height from the web (503).

In such a case, FIG. 6, the templates of the tooling may be made in two parts ($611_1$, $611_2$) assembled by a tenon and mortise system so as to enable the removal of the fitting after the precuring step.

Returning to FIG. 5 a spar portion may comprise a plurality of fittings ($510_1$, $510_2$, $510_3$, $510_4$, $510_5$) between its wings. According to this exemplary embodiment, one type of fitting ($510_1$, $510_3$, $510_5$) comprises a single rib between its flanges, another type of fitting ($510_2$, $510_4$) comprises at least one portion of the rib with a substantially Y-shape, this portion of the rib forming a clevis.

Figure 7:
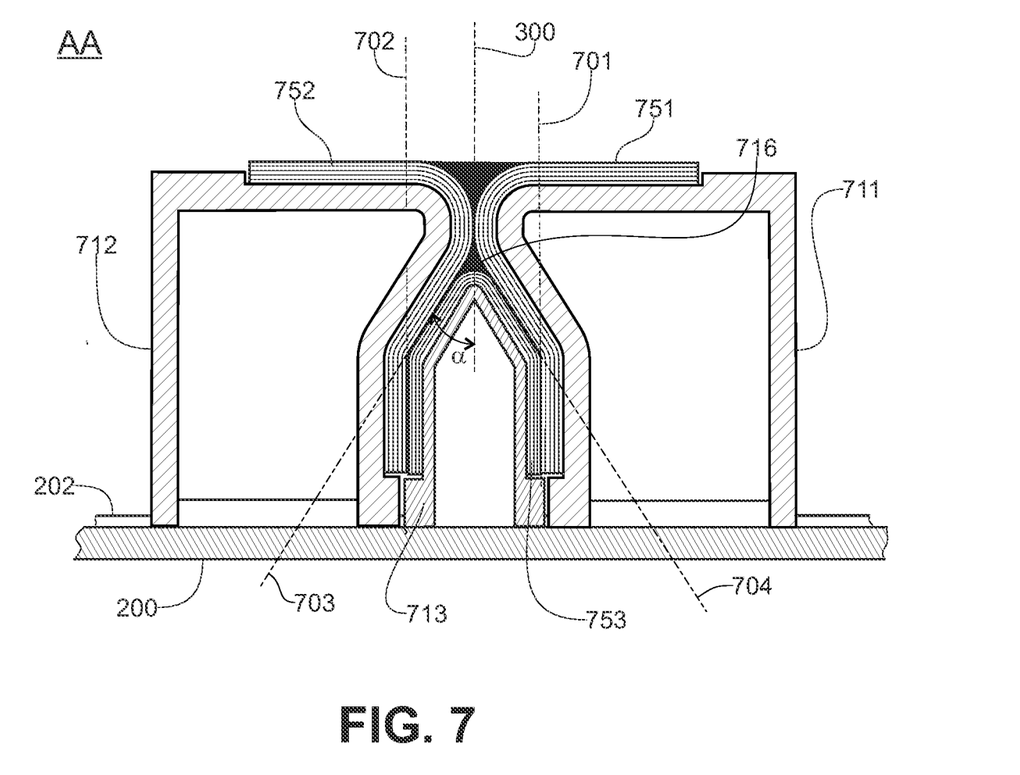
FIG. 7 shows according to a sectional view corresponding to section AA, an exemplary embodiment of a tooling for a fitting where the fitting comprises a clevis.

FIG. 7 the tooling for the lay up and precuring this type of fitting comprising a Y-shaped rib may be designed according to the same principles as explained above but may include an additional template in the form of a core (713), corresponding to the branches of the Y forming the clevis and which is inserted between the other two templates (711, 712).

The templates (711, 712) and the core (713) are guided in translation with respect to the base (200) on the guiding means (201, 202) as previously stated.

The preform of the fitting comprises 3 preforms, 2 half-preforms (751, 753) laid up over the templates (711, 712) and a preform of the clevis (753) laid up over the core (713).

The two half-preforms (751, 752) comprising the flanges are in contact according to a contact plane (300). They are also in contact along a plurality of interfaces (701, 702, 704, 704) with the preform of the clevis.

The space between the clevis preform (753) and the two half-preforms (751, 752) may be filled with a so-called nail head (716).

The contact planes that are not vertical (703, 704) or more precisely that are not perpendicular to the translational guidance direction provided by the translational guiding means, are slanted by an angle α with respect to this perpendicular (vertical in the figure).

During the precuring step, at least one of the templates (711, 712) or the core (713) may be locked for instance by a locating pin in the base. The pressure exerted by the tarp of the evacuated enclosure on the compacting plates and on the templates allows the assembly along their interfaces by partial co-polymerization of the 3 preforms (751, 752, 753).

During this precuring step, in order for the bulking to be controlled and for the partial co-polymerization to take place between the non-vertical interfaces (703, 704), the angle α should preferably be less than 45°, and more preferably should be less than 20°.

Figure 8:
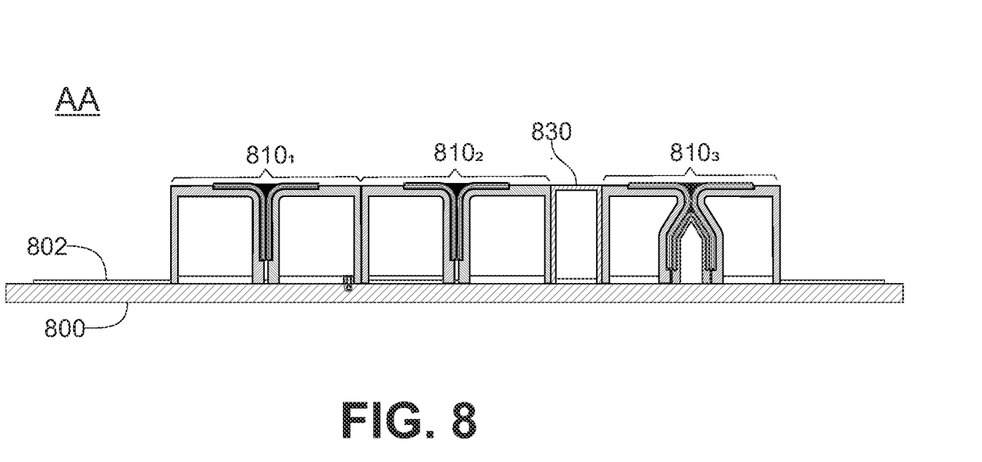
FIG. 8 shows according to a sectional plane equivalent to section AA an exemplary embodiment of a tooling comprising several templates for the simultaneous precuring of several fittings.

FIG. 8 for making a spar portion such as shown in FIG. 5, or a complete spar comprising a plurality of fittings, according to an advantageous embodiment, the tooling may comprise a plurality of pairs of templates ($810_1$, $810_2$, $810_3$) with or without an intermediate core so that all the fittings are precured during a same operation.

Thus, according to an exemplary embodiment, in a similar manner to the tooling for precuring a single fitting, the tooling with a plurality of pairs of templates comprises a base (800) comprising translational guiding means (802) of the templates relative to the base (800). The pairs of templates ($810_1$, $810_2$, $810_3$), whether or not comprising a template for a clevis type of preform are connected to the base by translational guiding means.

The pairs of templates ($810_1$, $810_2$, $810_3$) may be distributed along a longitudinal axis of the tooling according to the same distances as in the actual spar. Thus, according to an exemplary embodiment, one or more spacers (830) may be inserted between the pairs of templates so as to match these distances. Said spacers are also guided in translation on the base and according to alternative embodiments may or may not be, in whole or in part, jigged to the base, e.g., by a locating pin.

At least one of the templates may be stopped in translation relative to the base, the pairs of templates ($810_1$, $810_2$, $810_3$) and the spacers being juxtaposed in a contiguous manner, so that the compaction pressure exerted by the tarp by the evacuation of the enclosure during the precuring step, achieves the compaction of the ribs and the control of the bulking effect.

Figure 9:
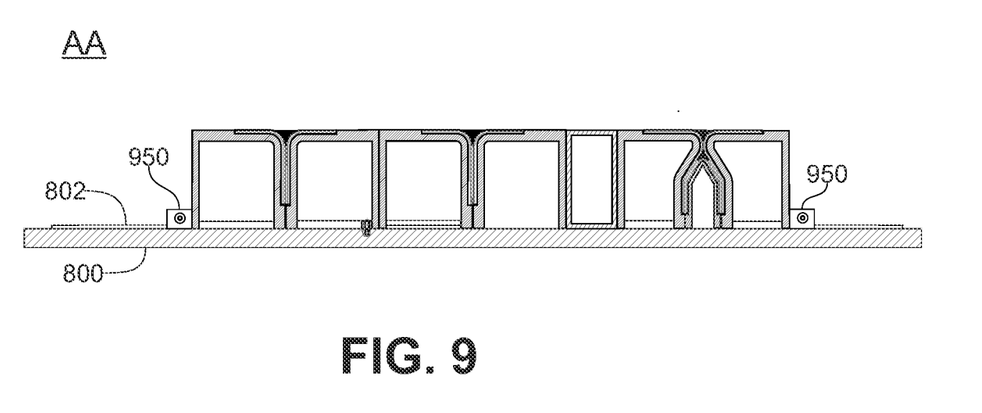
FIG. 9 shows the tooling of FIG. 8 after partial polymerization of the fittings.

FIG. 9 following the precuring step, the flanges of the partially polymerized and compacted fittings are flush with the outer surface of the tooling. The dimensions of the partially polymerized fittings are stable and equal to the final dimensions of these fittings.

According to an exemplary embodiment, if only one of the templates is jigged to the base, clamping staples (950) may be installed and tightened to the base (800) and to the translational guiding means (802). The tooling comprising the partially polymerized fittings is then used as a whole as a mandrel for the layup of the profile directly onto it. The layup is carried out manually or by automated fiber placement.

Figure 10:
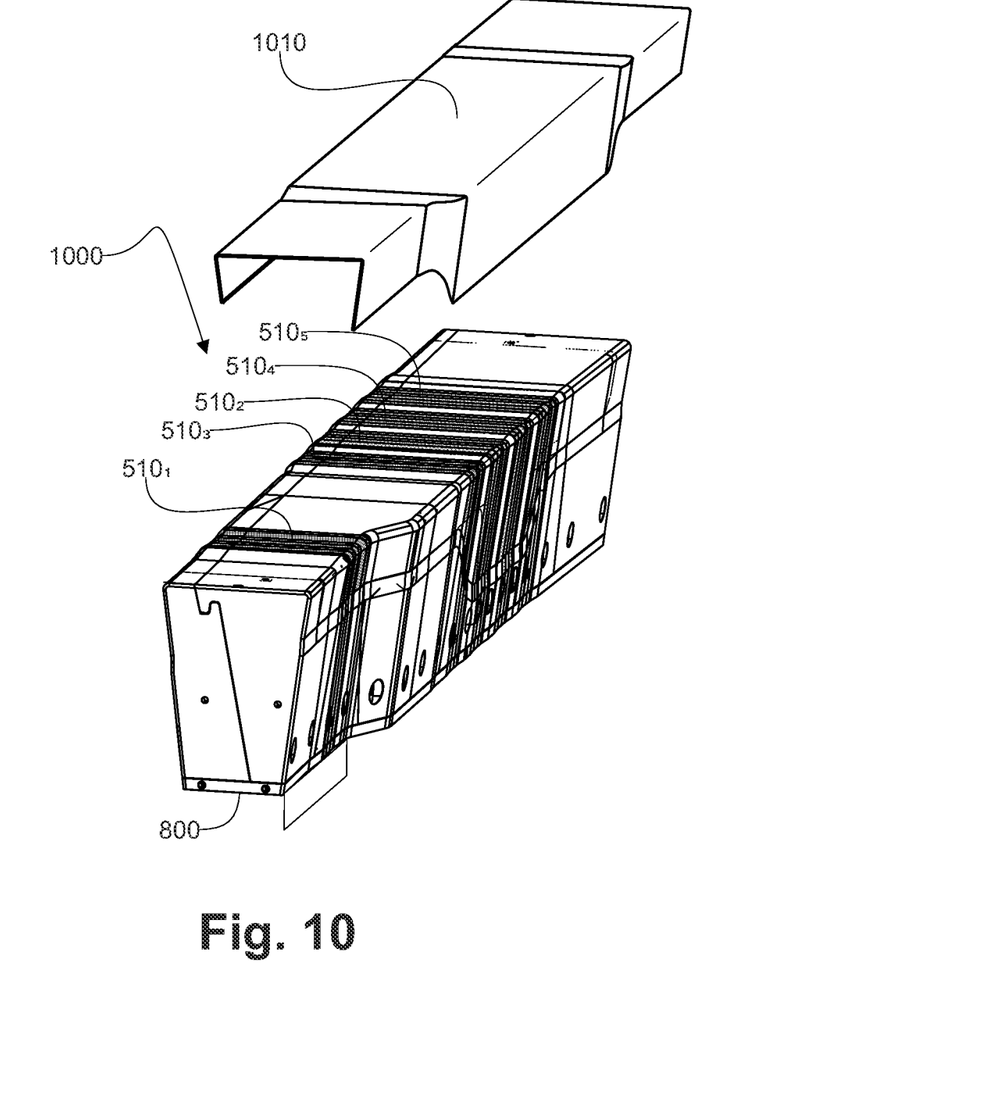
FIG. 10 is a perspective and exploded view of an exemplary embodiment of a tooling for the manufacturing of the part shown in FIG. 5.

FIG. 10 shows an exemplary embodiment of such a tooling (1000) corresponding to the spar section shown FIG. 5, comprising the partially polymerized fittings ($510_1$, $510_2$, $510_3$, $510_4$, $510_5$) installed in said tooling (1000) before the layup of the profile on this tooling used as a mandrel.

The layup of the preform of the profile (1010) is performed manually or by automated fiber placement on the tooling comprising the partially polymerized preforms.

The assembly is then bagged in a tight tarp, evacuated and polymerized by curing in an oven or autoclave.

Figure 11:
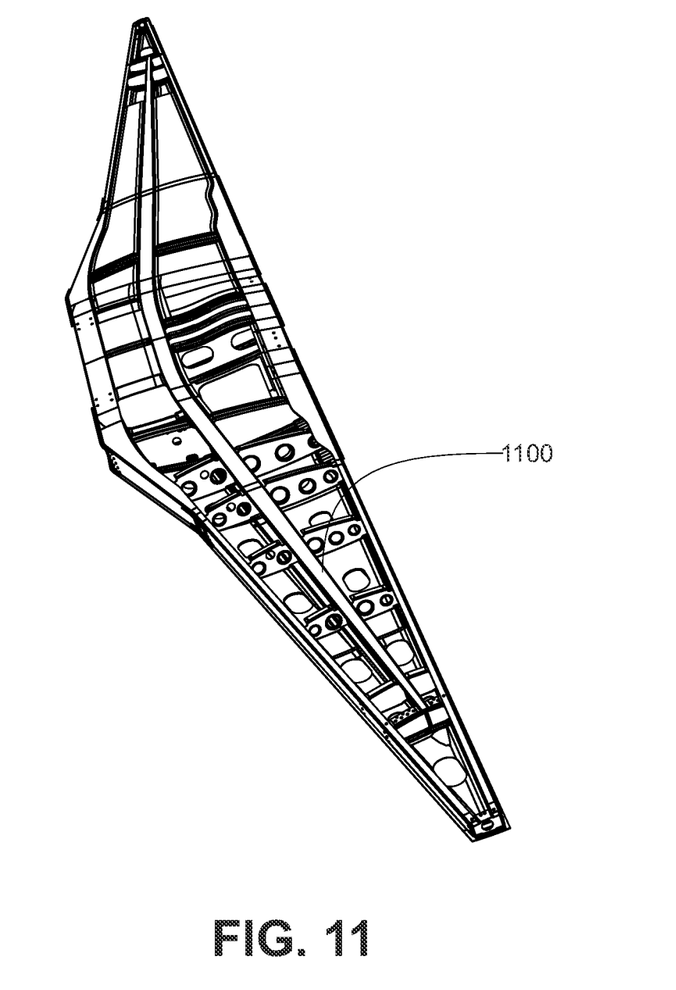
FIG. 11 shows, in a perspective and cutaway view, the integration of a spar according to the invention with a wing element of an aircraft.

FIG. 11 the method that may be implemented with the tooling described above, allows the manufacturing of profiles of great length, straight or curved with integral fittings, by the layup of pre-impregnated plies, a method that is more easily automated than the use of a dry preform and a resin injection molding method.

The method is thus particularly adapted to the manufacturing of a composite spar (1100) for an aircraft wing. In addition to the savings in weight and the simplification of sealing of the spar provided by the absence of fixtures, by keeping the same tooling throughout the manufacturing process, without dismantling and repositioning of the elements during this process, the fittings are perfectly positioned with respect to the spar, which also simplifies the assembly of the wing structure.

The invention claimed is:

1. A method for integrating a laminate composite fitting fitted between two wings of a laminate composite profile comprising steps of:
   I) obtaining a laminate preform of a fitting comprising a fibrous reinforcement impregnated with a thermosetting resin, the laminate preform of the fitting comprising two flanges intended to be inserted in contact between the two wings of the laminate composite profile and a rib extending between the two flanges and integral therewith;
   II) precuring the laminate preform of the fitting to obtain a partially polymerized laminate preform of the fitting;
   III) laying up of a profile preform of the laminate composite profile so that fibers impregnated with a thermosetting resin comprised the two wings of the profile preform of the laminate composite profile are laid up over the two flanges of the partially polymerized laminate preform of the fitting; and
   IV) completely polymerizing an assembly comprising the profile preform of the laminate composite profile and the partially polymerized laminate preform of the fitting while maintaining into contact the two flanges of the laminate preform of the fitting with the two wings of the profile preform of the laminate composite profile;
   wherein the laminate preform of the fitting comprises two half-preforms made by a layup of fibers pre-impregnated with the thermosetting resin, the two half-preforms being assembled by precuring during step II) along a contact plane located in the rib.

2. The method of claim 1, wherein a partial polymerization ratio obtained at an end of step II) is comprised between 70% and 80%.

3. The method of claim 1, wherein each of the two half-preforms is laid up on 4 faces of a template, and mean planes of at least 3 of the 4 faces are secants.

4. The method of claim 3, wherein the layup of the half-preform is performed by hand.

5. The method of claim 3, wherein the layup of the half-preform is performed by automated fiber placement.

6. The method of claim 1, wherein the rib of the fitting comprises two flanges forming a clevis, the method comprising before step II) steps of:
   obtaining a laminate composite preform of the clevis, and
   inserting the laminate composite preform of the clevis between the two half-preforms so that they are partially copolymerized together during step ii).

7. The method of claim 6, wherein the laminate composite preform of the clevis is laid up over a core.

8. The method of claim 7, wherein a portion of a branch of the clevis is canted by an angle α less than 45°.

9. The method of claim 1, wherein:
   a tooling is used for the partial polymerization of the laminate preform of the fitting in step II),
   the tooling is used as a mandrel, the partially polymerized laminate preform of the fitting being held in the tooling, for the layup of step III), and
   the tooling comprising the profile preform of the laminate composite profile that is laid up on the tooling in step III), is used for the complete polymerization of the assembly in step IV).

* * * * *